F. MITCHELL.
VALVE.
APPLICATION FILED OCT. 21, 1912.
1,244,630.
Patented Oct. 30, 1917.
2 SHEETS—SHEET 2.
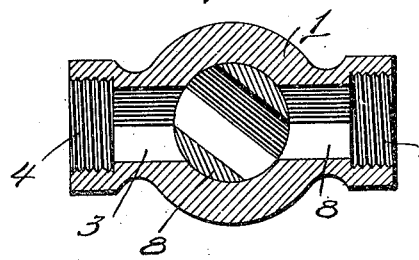
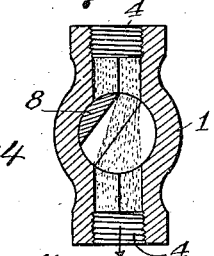
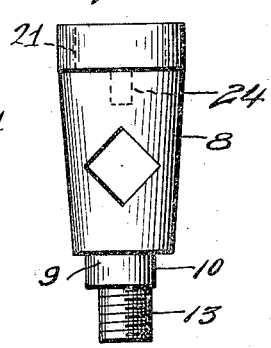
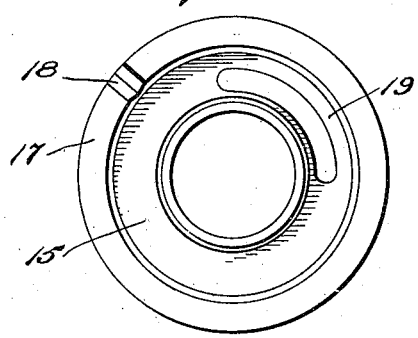
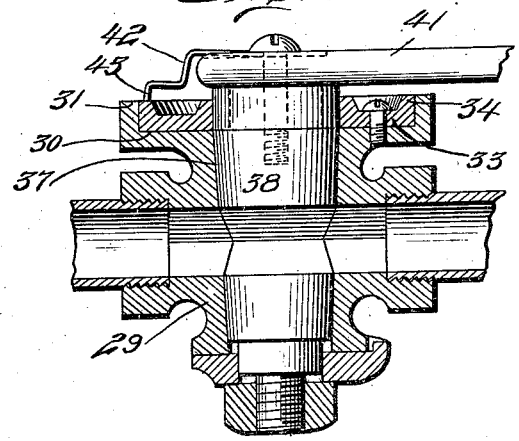
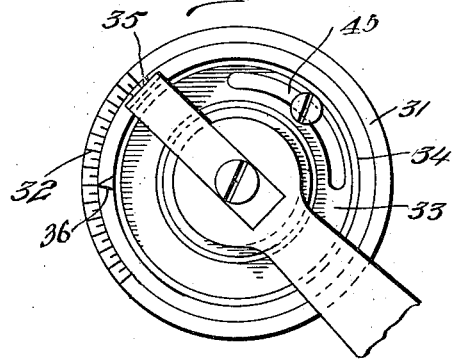
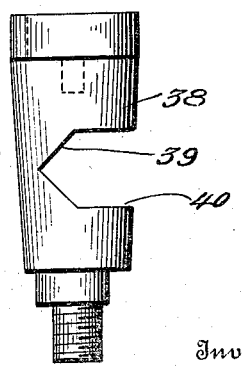
Witnesses
Inventor
Fred Mitchell
By H. B. Willson & Co.
Attorneys

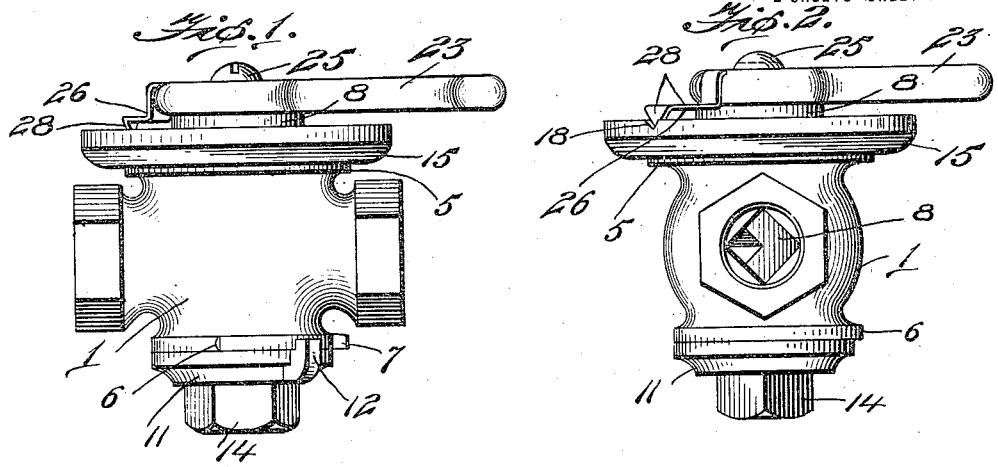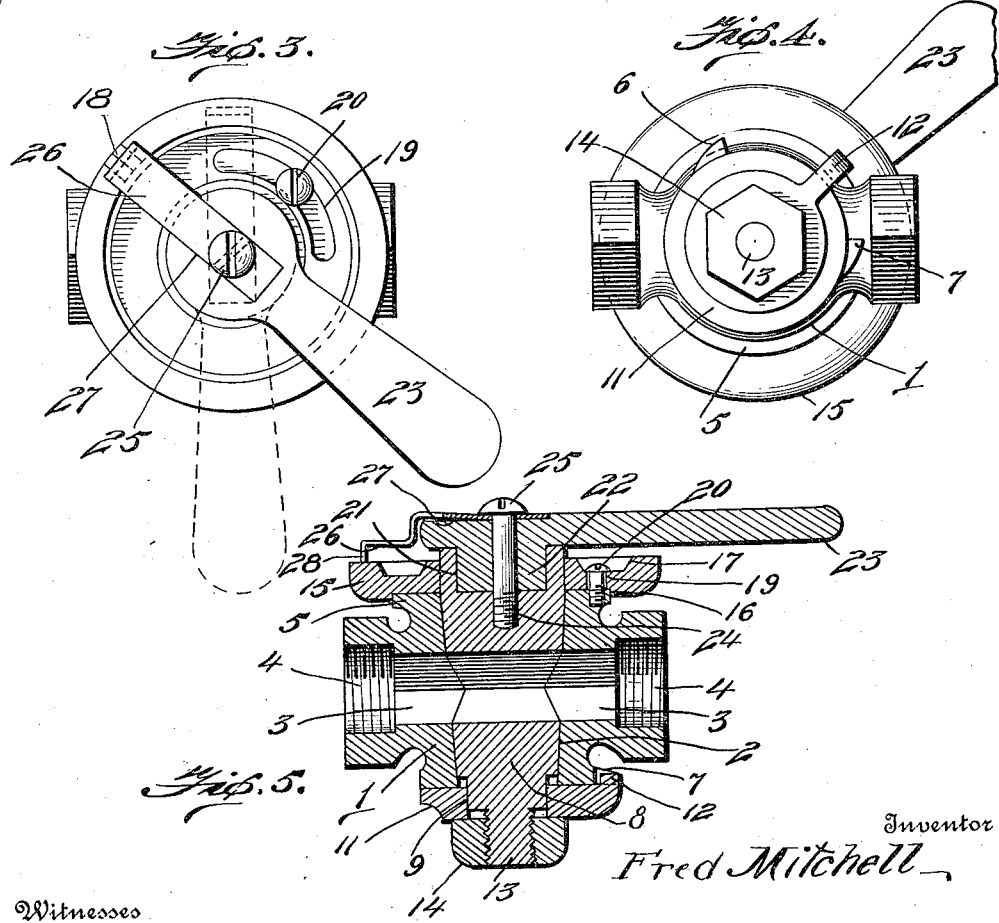

UNITED STATES PATENT OFFICE.

FRED MITCHELL, OF NEDERLAND, COLORADO.

VALVE.

1,244,630.  Specification of Letters Patent.  Patented Oct. 30, 1917.

Application filed October 21, 1912. Serial No. 727,005.

*To all whom it may concern:*

Be it known that I, FRED MITCHELL, a citizen of the United States, residing at Nederland, in the county of Boulder and State of Colorado, have invented certain new and useful Improvements in Valves; and I do declare the following to be a full, clear, and exact description of the invention, such as will enable others skilled in the art to which it appertains to make and use the same.

This invention relates to improvements in valves and more particularly to improvements in plug valves; and it comprises a valve made up of a valve casing and valve plug having therethrough openings or passages of an angular nature which will coact with each other to form an opening through the valve of a square or diamond pointed or other angular shape which will remain the same with different degrees of opening of the valve; it also comprises a plug valve whose plug or valve member is movable into full open and full closed position together with adjustable means for holding said plug or valve member yieldingly against casual movement at any desired intermediate position between full open and full closed positions; it further comprises a valve made up of a valve plug carrying a stop-engaging lug and a valve casing carrying stops arranged to engage said lug and arrest the movement of the plug on reaching full open and full closed position together with such yielding adjustable means; it further comprises a valve and valve plug provided with angular openings such as already described, the passage in the valve plug opening through one side of said plug to give an unrestricted outlet from the opening in said plug when the valve is set at a partly closed position; it also comprises certain novel features of construction and arrangement of parts as more fully hereinafter set forth and as claimed.

In valves which are used for controlling the circulation of calcium chlorid brine solutions in refrigeration and cold storage and for controlling the flow of slimes and other liquids carrying more or less sediment or foreign matter, there is a tendency for the valve to clog with resulting interruption of flow and with accompanying inconvenience and interruption of the operation of the system in which such valves are used. In systems where the accurate control of such fluids is necessary or where it is desired to control accurately the flow of steam or other vapor, it is desirable that a non-clogging valve with an opening accurately adjustable should be provided. With the ordinary plug valve having a round opening therein the relative dimensions of the opening through the valve varies with the degree of opening of the valve and when reduced to a small flow is a mere slit which quickly clogs when sediment or foreign matter is present.

It is the object of the present invention to provide a valve which at different degrees of opening will present an opening of the same shape so that this opening will preserve its identity of form irrespective of the degree of opening of the valve. This result is secured by making the passage through the valve casing and plug of an angular nature, such as square, or rectangular, or diamond shaped, with the opening so arranged that the angular nature of the passage will be preserved. As a result the passage retains the same relative dimensions irrespective of the degree of opening so that clogging with sediment or foreign matter is reduced to a minimum. When used as a throttle valve for controlling the flow of steam to hoisting, winding or other forms of steam engines, the steam can be admitted gradually and its flow readily adjusted and controlled.

The valve of the present invention is moreover provided with means which will enable it to be instantly turned to full open or full closed position from any intermediate adjusted position together with means for holding the valve in any desired intermediate adjusted position. This means is shown as stops carried by the plug and casing which engage each other at full open and full closed positions and yieldable spring-engaging fingers and recess so arranged as to engage each other at any desired intermediate position and hold the valve normally at such position so that it can be instantly moved into full open position and immediately returned to the point of adjustment. Means is thus provided for adjusting the valve to any desired rate of flow and for instantly returning the valve to the adjusted position after it has been moved as for instance to full open position for purposes of flushing. Means is also thus provided for securing any desired flow of steam, when the valve is used as a throttle valve, and for increasing the flow gradually on starting the engine, in order to avoid too rapid condensation.

In the following description and in the accompanying drawing are shown certain specific structures of valves embodying the features of novelty of the present invention.

In the accompanying drawings:

Figure 1 is a side view of my improved valve;

Fig. 2 is an end view of the same showing the passageway, the handle and adjusting device in partly open position;

Fig. 3 is a top plan view of the valve showing the handle in partly open position in full lines and in closed position in dotted lines;

Fig. 4 is a bottom plan of the valve;

Fig. 5 is a central vertical longitudinal section of the valve with the plug and handle in full open position;

Fig. 6 is a horizontal section of the valve with the plug in partly open position as in Fig. 2;

Fig. 6ª shows a section of the valve and valve plug of Figs. 9 and 11, with the distribution of the flow through the valve indicated;

Fig. 7 is a side view of the one form of the valve plug removed from the casing;

Fig. 8 is a detail plan of the adjusting ring;

Fig. 9 is a central vertical section of a modified form of the valve;

Fig. 10 is a top plan of the same;

Fig. 11 is a side view of a modified form of the valve plug removed from the casing;

Fig. 12 is a diagrammatic view illustrating the relative positions of the openings in the plug and casing of the valve to provide a passage which retains the same relative dimensions irrespective of the degree of opening;

Fig. 13 is a detail side view of a portion of the adjusting ring of the valve illustrating a slightly modified form of stop notch.

In the embodiment of the invention as shown in the first eight figures of the drawings 1 denotes the casing of the valve, said casing having a valve seat or passage 2 which may be of different forms but which is illustrated as a tapered valve seat. To this valve seat are connected oppositely disposed ports or passages 3 which communicate with interiorly threaded sockets 4 on the opposite ends of the casing as shown. The passages 3 in the valve casing according to this embodiment of the invention are rectangular or diamond shaped and are formed with their corners in line with the vertical and horizontal axes of the casing. The top or handle end of the valve casing has formed thereon a perfectly flat annular seat 5 the purpose of which will be hereinafter described. On the lower or opposite end of the valve casing are formed radially projecting stop lugs 6 and 7 which limit the movement of the valve plug when turned to full open or full closed position.

Revolubly mounted in the seat 2 in the casing of the valve is a valve plug 8 shown in the embodiment of the invention illustrated as tapered and conforming to the shape of the valve seat 2, having a reduced washer receiving extension 9 on its lower end, said extension having one side flattened as at 10 and adapted to receive a plug retaining washer 11, the aperture of which is flattened on one side to engage the flat portion of the extension 9, whereby the washer is held against turning on the plug. Projecting radially from one side of the washer 11 is a stop finger 12 the outer end of which is turned upwardly to coact with lugs 6 and 7 which serve to stop the plug at full open or closed position. On the outer end of the extension 9 of the plug is a threaded nipple 13 with which is engaged a clamping nut 14, whereby the washer 11 is held in operative engagement with the plug.

Loosely mounted on or engaged with the seat 5 on the upper end of the valve casing is an adjusting ring 15 in the lower side of which is an annular recess 16 adapted to receive the annular seat 5. The ring 15 is of somewhat greater diameter than the seat 5 of the valve casing and projects radially some distance beyond said seat. On the outer edge of the ring is an upwardly projecting annular flange 17 in which at a suitable position is formed a V-shaped stop notch 18. In the body of the ring is formed a segmental slot 19 with which is engaged a locking screw 20 which has a threaded engagement with the seat 5 of the valve casing and which when the ring 15 has been adjusted to bring the notch 17 to a proper position is adapted to be tightened up, thereby clamping and securely locking the ring in its adjusted position.

The upper end of the valve plug is cylindrical and projects through the ring 15 and in said projecting upper end of the plug is a rectangular recess 21 with which is engaged a rectangular boss 22 formed on the inner end of a plug operating handle 23 which projects outwardly beyond the ring 15 as shown. In the bottom of the recess is a threaded socket 24 with which is engaged a handle clamping screw 25 which is engaged with a passage in the head and boss of the handle and which is also engaged with the inner end of a spring stop finger 26, whereby the latter is secured at its inner end in a recess 27 in the upper side of the handle as shown. The outer end of the stop finger 26 is turned downwardly at right angles to form a V-shaped stop lug 28 which is adapted to spring into engagement with the V-shaped notch 18 in the flange 17 of the adjusting ring 15. When the V-shaped stop lug 28 engages the V-shaped notch 18 in the ring 15 and the ring is loosely mounted in its annular seat 5 on the top of the valve casing, the plug can be turned to provide the desired opening or passage through the valve and the ring 15 will be turned to the same extent. Then by tightening the locking screw 20 the ring 15 can be securely clamped to its annular seat 5 and the lug will then be held in this position against jarring or casual movement. While the engagement of the lug or the spring finger 26 with the stop notch 18 is sufficient to hold the plug against casual movement it is not sufficient to prevent the plug from being manually turned to instantly bring the same to a full open position for the purpose of flushing or permitting a full force of fluid to pass through the valve thereby removing any sediment or other matter which might have accumulated and caused a stoppage or partial stoppage of the reduced passage of the valve. As soon as the obstruction has thus been removed the plug may be quickly turned back by the handle to again engage the spring finger 26 with the stop notch 18 thus again reducing the passage through the valve to the same dimensions as before.

It will thus be seen that the ring 15 can be freely turned with the plug and its handle so long as the screw 20 is loosened, and can be clamped in any desired adjusted position by tightening the screw 20. The engagement of the spring lug 28 with the notch 15 can accordingly be made to represent any desired degree of opening of the valve between full open and full closed position and the valve can be moved manually from this position of engagement and adjustment either to open or close the valve, while by moving the parts back to reëngagement of the spring lug and notch the valve will be again returned to its position of adjustment.

In Figs 9, 10, 11 and 13 is shown a modification of the invention which is of particular value where a carefully controlled flow through the valve is desired, and where it is desired to indicate automatically the degree of opening and the corresponding flow. In this instance the valve comprises a casing 29 which is similar in construction to the casing 1 except that the seat 30 on the upper end of the casing to receive the adjusting ring is provided with an annular upwardly projecting flange 31 the upper edge of which for about one-fourth of the distance around the same and at a proper position is marked with a scale of graduations 32 the purpose of which will be hereinafter described. Loosely mounted on the seat 30 within the flange 31 is an adjusting ring 33 which is constructed similar to the ring 15 of the first form of the invention and has on its outer edge an annular flange 34 in the upper side of which and at a suitable point is a V-shaped notch 35 and at a suitable point with respect to the segmental slot 45 is arranged an indicating mark 36 which is adapted to co-act with the scale of graduations 32, whereby the position of the notch in the ring and the corresponding flow will be indicated.

In the casing is a tapered plug seat 37 with which is engaged a tapered plug 38 which is constructed in the same manner as the plug 8 of the first form of the invention except that the passage 39 of the plug 38 opens through one side of the plug as shown at 40, the purpose of which is to cover but one port in the casing and thereby provide a reduced passageway through the valve which will permit direct flow of the material passing through the valve without deflection as shown in Fig. 6$^a$ of the drawing and prevent the same from being thrown violently against one wall of the casing and quickly wearing a hole through the same.

The plug 38 is provided with an operating handle 41 which is secured at its inner end to the upper end of the plug in the same manner as the handle 23 and has secured thereto a spring stop finger 42 which corresponds with the stop finger 26 and is provided on its outer end with a V-shaped lug 43 which is adapted to spring into engagement with the V-shaped notch 35 in the flange of the adjusting ring 33, whereby the handle and the plug to which it is attached are held in their adjusted positions for providing a passage of the desired size in the valve. The graduations 32 on the flange 31 of the seat 30 are in such position with respect to the passages in the valve casing that the adjusting ring 33 may be turned and set with the indicating mark 36 thereon opposite to the desired graduation on the flange of the seat 30 so that the notch 35 will be in position to receive the spring stop finger on the plug when the latter has been turned by the handle to a distance corresponding with the distance indicated on the scale of graduations as will be readily understood.

While I have stated that my improved valve is especially designed for use in connection with fluids having more or less sediment or foreign matter which would quickly obstruct an ordinary valve when turned to form a reduced passage, it is obvious that the valve is not confined to this particular use as the same may be advantageously employed for many other purposes such, for instance, as a throttle valve for hoisting or other forms of engines. While in the embodiment of the invention illustrated in the drawings the valve casing and plug are shown as having square passages yet it will be obvious that other passages of an angular nature can be used which will give a rectangular or diamond shaped opening through the valve which will remain of the same shape at different degrees of opening of the valve. While I have herein shown and described the stop notch in the adjusting rings of the valves as being V-shaped, it is obvious that a square or rectangular notch 44 as shown in Fig. 13 instead of the V-shaped notch may be used thereby providing a more positive lock or stop for the spring detent or stop finger of the valve.

While the valve plugs 8 and 38 and their respective seats are herein shown and described as being tapered, I do not wish to be understood as confining myself to a tapered valve seat and plug as it is obvious I may provide a cylindrical plug and seat which in the case of a throttle or some other varieties of valve will be preferable to a tapered plug and seat.

Having thus described my invention, what I claim is:

1. In a valve of the character described, a casing having therein a plug seat and sockets in opposite sides of said casing having openings communicating with the plug seat, an annular seat on one end of said casing, a flange surrounding said seat and having thereon a scale of graduations, an adjusting ring loosely mounted on said flanged seat and having an indicating mark adapted to coact with the graduations, a plug engaged in the plug seat and having an opening, a pointer carried by said plug and arranged to coöperate with said scale, and means for operating said plug.

2. In a valve of the character described, a casing having therein a plug seat and sockets in the opposite sides of said casing communicating with said plug seat, stops on the lower end of said casing, a plug in said plug seat and having therethrough a passage adapted to be brought into greater or less alinement with the sockets, an adjusting ring mounted to turn on said casing and having therein a notch, means for operating said plug, a finger carried by the plug and adapted to be brought into engagement with said stops, and a spring stop carried by the plug and adapted to spring into engagement with said notch in the adjusting ring whereby the movement of the valve is yieldingly stopped at any desired point.

3. In a valve of the character described, a casing having therein a tapered plug seat, sockets arranged on the opposite sides of said casing and communicating with said tapered plug seat, stop lugs formed on the bottom of said casing, a tapered plug operatively engaged with the plug seat in said casing and having therethrough a passage adapted to be brought into greater or less alinement with the sockets of the casing, an adjusting ring mounted to turn on said casing and having therein a notch, means for operating said plug, a washer secured to the opposite end of the plug and having thereon a stop finger adapted to be brought into engagement with the stop lugs on this end of the casing whereby the movement of the plug is stopped when the latter is brought to full open and closed positions, and a spring stop finger carried by the plug and adapted to spring into engagement with the stop notch in said adjusting ring whereby the movement of the valve is yieldingly stopped at any desired point.

4. In a valve of the character described, a casing having therein a tapered valve seat, sockets on the opposite sides of said casing and having at their inner ends angular openings communicating with the plug seat of the casing, an annular seat on one end of said casing, a flange surrounding said seat and having thereon a scale of graduations, an adjusting ring loosely mounted on said flanged seat and having therein a notch, and an indicating mark adapted to co-act with the graduations on said seat whereby the position of the notch in the ring is indicated, means to fasten said ring in its adjusted positions, a plug engaged with the plug seat in said casing and having therein an angular opening adapted to be brought into greater or less alinement with the angular openings in the casing whereby angular passages of the same shape but of different sizes may be formed in the valve, means for operating said plug, and a spring stop finger carried by said plug and adapted to be brought into engagement with the notch in said ring, whereby the plug is yieldingly held in its adjusted positions.

5. A valve of the nature described comprising a valve casing provided with angular openings, a valve plug provided with an angular passage coacting with the openings in said valve casing to form an opening of the same shape with different degrees of opening of the valve, said valve plug being movable into full open and full closed positions, and adjustable means for holding said plug yieldingly against casual movement at any desired intermediate position whereby the valve plug can be moved into either full open or full closed position from said intermediate adjusted position.

6. A valve of the nature described comprising a valve casing provided with angular openings, a valve plug provided with an angular passage coacting with the openings in said valve casing to form an opening of the same shape with different degrees of opening of the valve, said valve plug being movable into full open and full closed positions, stops arranged to arrest the movement of said plug on reaching such positions, and adjustable means for holding said plug yieldingly at any desired intermediate position, whereby the valve plug can be moved into full open or full closed position from said intermediate adjusted position.

7. A valve of the nature described comprising a valve casing provided with angular openings, a valve plug provided with an angular passage coacting with the openings in said valve casing to form an opening of the same shape with different degrees of opening of the valve, said valve plug being movable into full open and full closed positions, a stop engaging lug carried by said plug and stops on said casing arranged to engage said lug and arrest the movement of the plug on reaching said full-open and full-closed positions, and adjustable means for holding said plug yieldingly at any desired intermediate position, whereby the valve plug can be moved into full open or full closed position from said intermediate adjusted position.

8. A valve comprising a valve casing provided with angular openings through its sides, a valve plug symmetrically arranged with respect to said openings and provided with an angular passage coacting with the openings in the valve casing to form an opening through the valve of the same shape with different degrees of opening of the valve, the passage in said valve plug opening through one side of the said plug to permit an unrestricted passageway from said plug to one of said openings in the valve casing, said valve plug being movable into full open and full closed positions, and adjustable means for holding said plug yieldingly against casual movement at any desired intermediate position.

9. A valve comprising a housing and a valve-plug rotatably seated therein, coöperative means for restricting the movement of the valve plug to determine its full-open and closed positions, a member on the housing and a therewith coöperative member on the valve plug having means to yieldingly interlock at a determinate point in the rotation of the valve-plug intermediate of the said positions whereby to hold the plug against casual movement, the member on the housing being adjustable to vary the position of the point at which the movement of the valve is arrested by its said interlocking engagement with the other member.

10. A valve comprising a housing and a valve-plug rotatably seated therein, coöperative means for restricting the movement of the valve plug to determine its full-open and closed positions, a member on the housing and a therewith coöperative member on the valve-plug having means to yieldingly interlock at a determinate point in the rotation of the valve plug intermediate of the said positions, whereby to hold the plug against casual movement, one of said members being adjustable to vary the position of the point at which the movement of the valve is arrested by its said interlocking engagement with the other member.

11. A valve comprising a housing and a valve-plug rotatably seated therein, coöperative means for restricting the movement of the valve-plug to determine its full-open and closed positions, a member on the housing and a therewith coöperative member on the valve-plug having means to yieldingly interlock at a determinate point in the rotation of the valve plug intermediate of the said positions whereby to hold the plug against casual movement, one of the members being adjustable to vary the position of the point at which the movement of the valve is arrested by its engagement with the other member, and the adjustable member and the valve-part on which it is mounted having coöperative means for measuring the degree of adjustment of the said member.

12. A valve comprising a housing, a valve-plug rotatably seated therein, a member adjustably mounted on the housing and having an indicating mark and a notch, means for securing said member in its adjusted positions, and a resilient finger carried on the valve-plug to coöperate with the said notch for holding the plug against casual movement, the housing having a graduated scale along the line of motion of the said indicating mark, to determine the degree of the adjustment of the member.

13. A valve comprising a housing and a valve-plug rotatably seated therein having coöperative means for restricting the movement of the valve-plug to determine its full-open and closed positions, a member adjustably mounted on the housing and having a notch, means for securing said member in its adjusted positions, and a resilient finger carried on the valve plug to coöperate with the said notch for holding the plug against casual movement.

14. A valve comprising a housing and a valve-plug rotatably seated therein, a member on the housing and a therewith coöperative member on the valve plug, having means to yieldingly interlock at a determinate point in the rotation of the valve-plug intermediate of its full-open and closed positions, whereby the plug is held against casual movement, one of said members being adjustable to vary the position of the point at which the movement of the valve is arrested by its said interlocking engagement with the other member, and the adjustable member and the valve part on which it is mounted having coöperative means for measuring the degree of adjustment of the said member.

In testimony whereof I have hereunto set my hand in presence of two subscribing witnesses.

FRED MITCHELL.

Witnesses:
CHAS. H. CHENEY,
LEWIS C. ALLISON.

Copies of this patent may be obtained for five cents each, by addressing the "Commissioner of Patents, Washington, D. C."